US011412664B2

(12) United States Patent
Soles et al.

(10) Patent No.: US 11,412,664 B2
(45) Date of Patent: Aug. 16, 2022

(54) FILL UNDER GRAIN COVER

(71) Applicant: Soles Enterprises, Inc, Brandon, SD (US)

(72) Inventors: Ben Soles, Brandon, SD (US); Ralph Soles, III, Brandon, SD (US)

(73) Assignee: Soles Enterprises, Inc, Brandon, SD (US)

( * ) Notice: Subject to any disclaimer, the term of this patent is extended or adjusted under 35 U.S.C. 154(b) by 62 days.

(21) Appl. No.: 17/117,428

(22) Filed: Dec. 10, 2020

(65) Prior Publication Data

US 2022/0183233 A1 Jun. 16, 2022

(51) Int. Cl.
| | | |
|---|---|---|
| *A01F 25/13* | (2006.01) | |
| *B65G 3/04* | (2006.01) | |
| *E04H 7/22* | (2006.01) | |

(52) U.S. Cl.
CPC .............. *A01F 25/13* (2013.01); *B65G 3/04* (2013.01); *E04H 7/22* (2013.01)

(58) Field of Classification Search
CPC .. A01F 25/13; B65G 3/00; B65G 3/02; B65G 3/04; E04H 7/22; E04H 15/54; B60P 7/04; B60P 7/0876
See application file for complete search history.

(56) References Cited

U.S. PATENT DOCUMENTS

| | | | | |
|---|---|---|---|---|
| 2,804,897 A | * | 9/1957 | Wunderwald | B65D 88/16 383/102 |
| 4,454,807 A | * | 6/1984 | Wolstenholme | B65G 3/02 414/919 |
| 4,493,248 A | * | 1/1985 | Wolstenholme | B65G 3/02 366/101 |
| RE32,536 E | * | 11/1987 | Wolstenholme | B65G 3/02 414/919 |
| 5,263,896 A | * | 11/1993 | Carroll | B65G 3/02 454/181 |
| 10,378,235 B1 | | 8/2019 | Volin | |
| 2016/0010354 A1 | * | 1/2016 | Gaudet, III | E04H 15/54 428/221 |
| 2020/0063429 A1 | | 2/2020 | Carter | |

FOREIGN PATENT DOCUMENTS

CN 207033041 U 2/2018

* cited by examiner

*Primary Examiner* — Andrew J Triggs
(74) *Attorney, Agent, or Firm* — Goodhue, Coleman & Owens, P.C.

(57) ABSTRACT

A fill under tarp for grain and grain storage system is disclosed. The fill under has a tarp body with a plurality of tarp sections having an inner edge extending to a terminal outer edge defining an outer perimeter. A tarp section seam is disposed between tarp sections. A yoke having a center and opposing inner and outer terminal edges is disposed generally in the center of the tarp body and configured for strengthening the tarp body. A corner of the outer terminal edge of the yoke is disposed coincident with the tarp section seam. A transition seam is disposed between the outer terminal edge of the yoke and inner edge of the tarp body. An opening in the yoke has an outer circumference coincident with the inner edge of the yoke so that the opening is configured to receive grain for storing underneath the fill under tarp.

20 Claims, 12 Drawing Sheets

FILL UNDER GRAIN COVER

FIELD OF THE DISCLOSURE

The present disclosure relates to a cover for temporarily storing agricultural grains. More particularly, but not exclusively, the present disclosure relates to a fill under cover, such as a tarp, for covering agricultural grains.

BACKGROUND

Coverings, such as fill under tarps, are used to cover grain (e.g., corn, soybean, milo, and wheat) that is temporarily stored at a grain storage site or other suitable locations. In the case of a fill under tarp, the tarp is typically installed at the grain storage site before being filled with grain. The fill under tarp forms a generally conically shaped pile of covered grain when filled. Fill under tarps typically have seams joining several sections of material and transitional seams joining materials can be different by type, thickness, and quality. Collectively these materials form an assembled fill under covering. If the fill under tarp fails, it often occurs at one or more of the seams, and more often one or more of the transition seams. This is especially true for the transition seam between the yoke and tarp body. It is also the case that the assembled sections of a fill under tarp do not best approximate the conically shaped pile of covered grain thereby resulting in wasted material and uneven stress distributions at seams, transitions, and connections to the tower. Therefore, what is needed is a fill under grain covering that addresses these and other deficiencies.

SUMMARY

Therefore, it is a primary object, feature, or advantage of the present disclosure to improve over the state of the art.

It is a further object, feature, or advantage of the present disclosure to provide a grain cover that is configured to address and remedy failures in existing grain covers.

It is a still further object, feature, or advantage of the present disclosure to provide a fill under tarp that is configured to address and remedy failures in existing fill under tarps.

Another object, feature, or advantage is to provide a fill under tarp that includes a yoke configuration addressing and remedying failures in existing yoke configurations.

Yet another object, feature, or advantage is to provide a fill under tarp that includes a transitional seam between the yoke and tarp body that addresses and remedies failures in existing transitional seams.

Still another object, feature, or advantage is to provide a fill under tarp that includes a yoke and tarp body configured to approximate the conically shaped pile of covered grain to address and remedy, for example, wasted material and uneven stress distributions at seams, transitions, and connections to the tower.

According to at least one aspect, a fill under tarp for grain and grain storage system is disclosed. The fill under tarp can be configured to include a tarp body having a plurality of tarp sections where each tarp section has an inner edge extending to a terminal outer edge defining an outer perimeter of the tarp body. A tarp section seam is disposed between each adjoining tarp section whereby the seam extends between the inner and terminal outer edge of the tarp body. A yoke having a center and opposing inner and outer terminal edges is disposed generally in the center of the tarp body and configured for strengthening the tarp body. A corner of the outer terminal edge of the yoke is disposed coincident with the tarp section seam. A transition seam is disposed between the outer terminal edge of the yoke and inner edge of the tarp body. An opening in the yoke has an outer circumference coincident with the inner edge of the yoke so that the opening is configured to receive grain for storing underneath the fill under tarp.

According to at least one other aspect, a fill under tarp for grain is disclosed. The fill under tarp includes a tarp body having a plurality of tarp sections, where each tarp section has an inner edge extending to a terminal outer edge defining a circular outer perimeter of the tarp body. A tarp section seam is disposed between each adjoining tarp section. The tarp section seam extends between the inner and terminal outer edge of the tarp body. A yoke has a center, an inner circular-shaped edge, an outer square-shaped edge having four vertices, and diagonals between the four vertices. The yoke is disposed generally in the center of the tarp body and configured for strengthening the tarp body. A corner at each of the vertices of the outer square-shaped edge of the yoke is disposed coincident with the tarp section seam. A transition seam is disposed between the outer square-shaped edge of the yoke and inner edge of the tarp body. An opening in the yoke has an outer circumference coincident with the inner edge of the yoke. The opening is configured to receive grain for storing underneath the fill under tarp.

According to another aspect, a grain storage system is disclosed. The grain storage system includes, for example, a grain storage location having a barrier wall forming a bunker. A tower structure is operably configured with a conveyor for transporting grain to store within the bunker. A fill under tarp is supported by the tower structure atop the bunker. The fill under tarp includes, for example, a tarp body having a plurality of tarp sections where each tarp section has an inner edge extending to a terminal outer edge defining an outer perimeter of the tarp body. The terminal outer edge is battened to the barrier wall. A tarp section seam is disposed between each adjoining tarp section. The tarp section seam extends between the inner and terminal outer edge of the tarp body. A yoke has a center and opposing inner and outer terminal edges, and the yoke is disposed generally in the center of the tarp body and configured for strengthening the tarp body. A corner of the outer terminal edge of the yoke is disposed coincident with the tarp section seam. A transition seam is disposed between the outer terminal edge of the yoke and inner edge of the tarp body. An opening in the yoke has an outer circumference coincident with the inner edge of the yoke. The opening is configured to receive grain from the conveyor for storing in the bunker underneath the fill under tarp.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein, and where.

DETAILED DESCRIPTION

Figure 1:
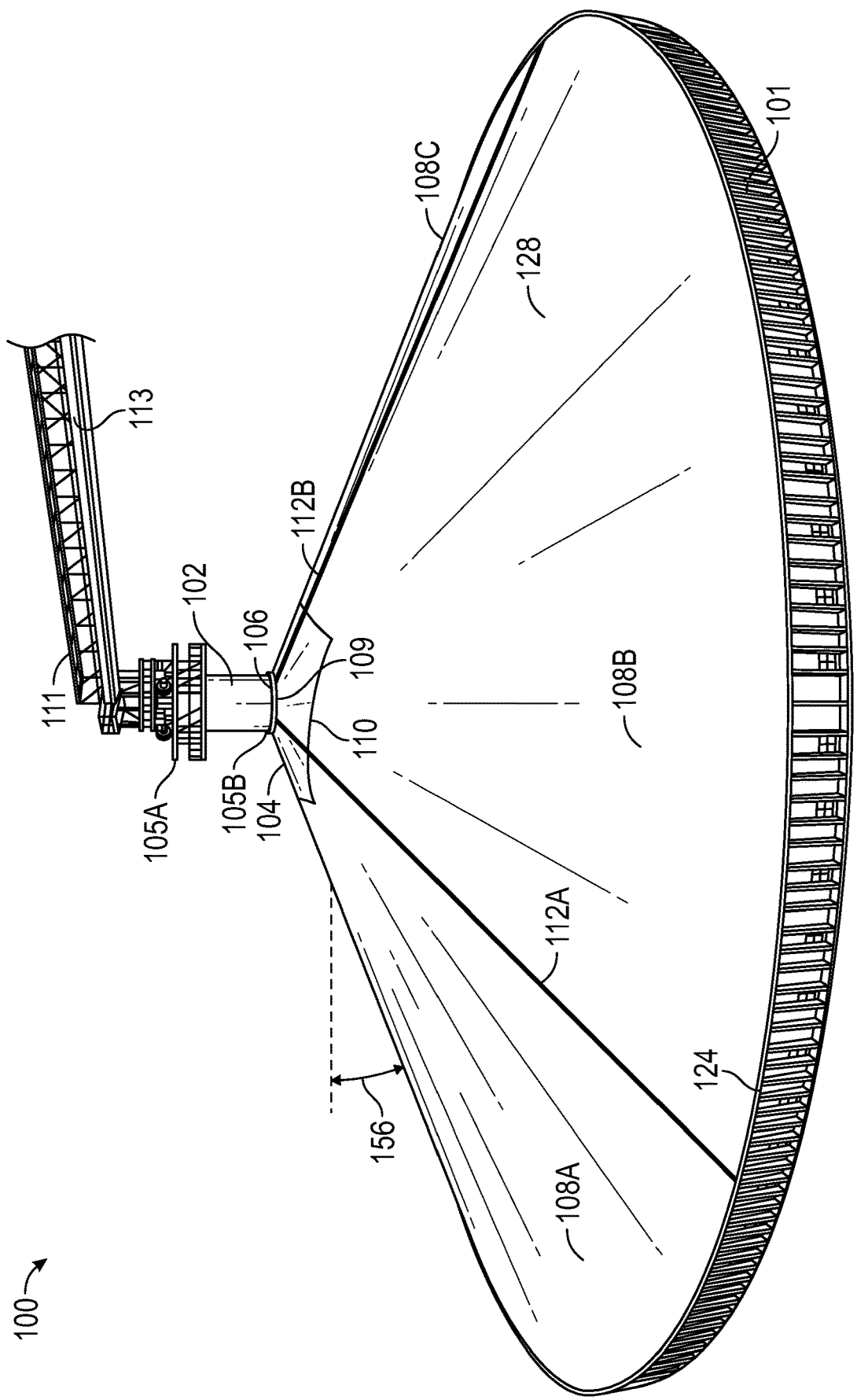
FIG. 1 is a pictorial representation showing the conical shape of a fill under tarp.
Figure 2:
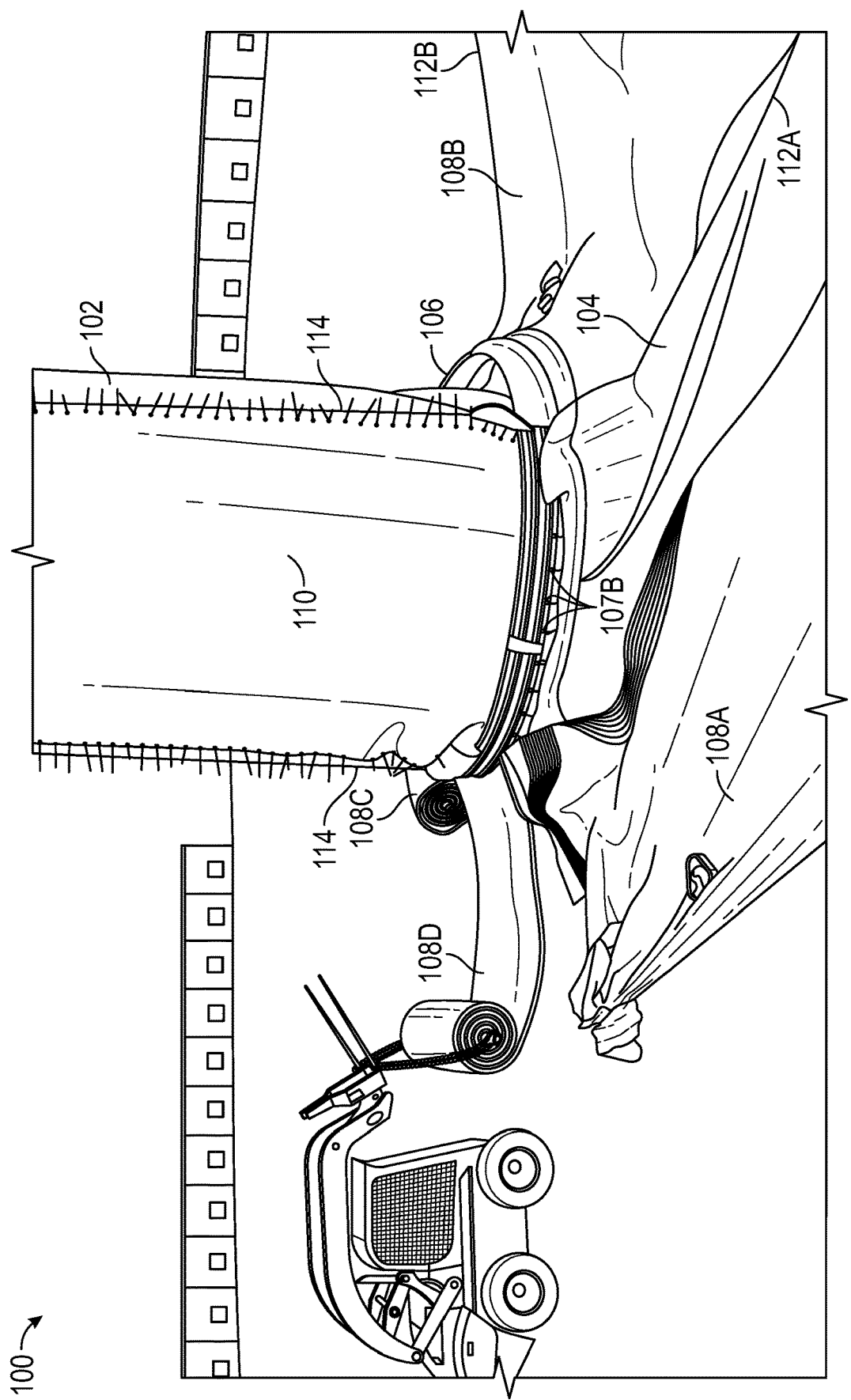
FIG. 2 is a pictorial representation showing assembly of a fill under tarp to a center tower skirt.
Figure 3:
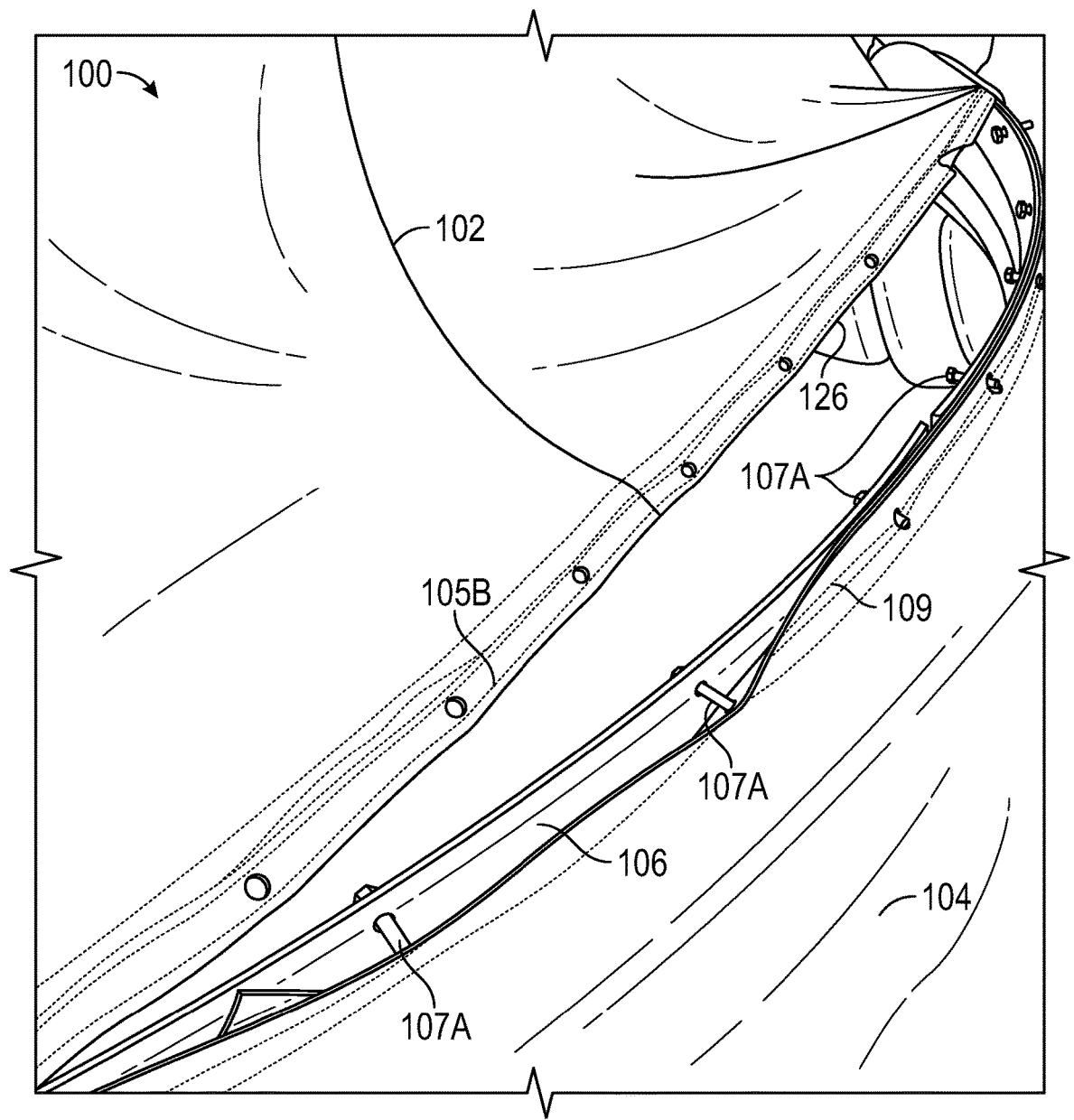
FIG. 3 is a pictorial representation showing assembly of a lift ring to sections of the fill under tarp.

Grain covers, such as a fill under tarp 100 system, are used to cover stored grain 132 (e.g., corn, soybean, milo, and wheat) as illustrated in the FIGS. 1-11. Types of fill under tarp 100 materials and thicknesses can vary. Material selection and thickness can depend on a range of factors, such as, for example, the use environment, application, desired life and durability, cost, and the material location (e.g., yoke, tarp body, center tower skirt, etc.) within the fill under tarp 100. Generally, fill under tarp 100 systems are fabricated with heavier materials than tarp after filling systems.

Fill under tarp 100 can be used in combination with a barrier wall 101 for forming a bunker 103. An outer terminal edge 124 of the body 128 of the tarp 100 can be secured to the barrier wall 101 with battening for enclosing the volume underneath the fill under tarp 100. The outer terminal edge 124 is shown, for example, by a line that approximates the outer edge of each of the tarp panels 114. The barrier wall 101 is typically constructed from concrete or steel for forming the bunker 103. Battening (not shown) is generally attached to the upper portion of the barrier wall 101 for securing the outer terminal edge 124 to the barrier wall 101.

At least one type of fill under tarp 100 can include a center tower skirt 102, which grain is fed through into the conically shaped volume underneath the tarp 100, using a grain conveyor 113 supported by one or more tower structures 111. The center tower skirt 102 has a generally circular outer circumference extending between an upper edge 105A and a lower edge 105B. The upper edge 105A of the center tower skirt 102 is operably secured to the tower structure 111. The lower edge 105B of the center tower skirt 102 is operably attached to a lift ring 106 via bolts (107A) or other means. The lift ring 106 can be fabricated from steel, aluminum, composite, or other suitable, generally stiff materials. The lift ring 106 is typically circular in shape and approximates the outer circumference of the opening 126 at the lower edge 105B of the center tower skirt 102.

A yoke 104 forming an inward or center portion of the tarp 100 is often secured to the lift ring 106, such as, for example, using a plurality of hooks 107B. Other attachment mechanisms can be employed to secure the yoke 104 to the lift ring 106 and center tower skirt 102. Similarly, an inner edge 109 of the yoke 104 is also secured to the lift ring 106 and the center tower skirt 102 with bolts 107A. Other attachment mechanisms can be employed to secure the inner edge 109 of the yoke 104 to the lift ring 106 and center tower skirt 102. The lift ring 106 is supported vertically by cables 114 connected to and extending between the tower structure 111 and the lift ring 106. The tarp 100 is generally conical in shape and generally has a preferred angle, or an angle of repose 156 for the specific type of grain material, of approximately 21 degrees or thereabout relative to a horizontal plane, as shown in FIG. 1, when the volume underneath the tarp 100 is filled. The angle can vary, such as, for example, less than 21 degrees (e.g., 18, 19, 20 degrees) or more than 21 degrees (e.g., 22, 23, 24 degrees).

Figure 4:
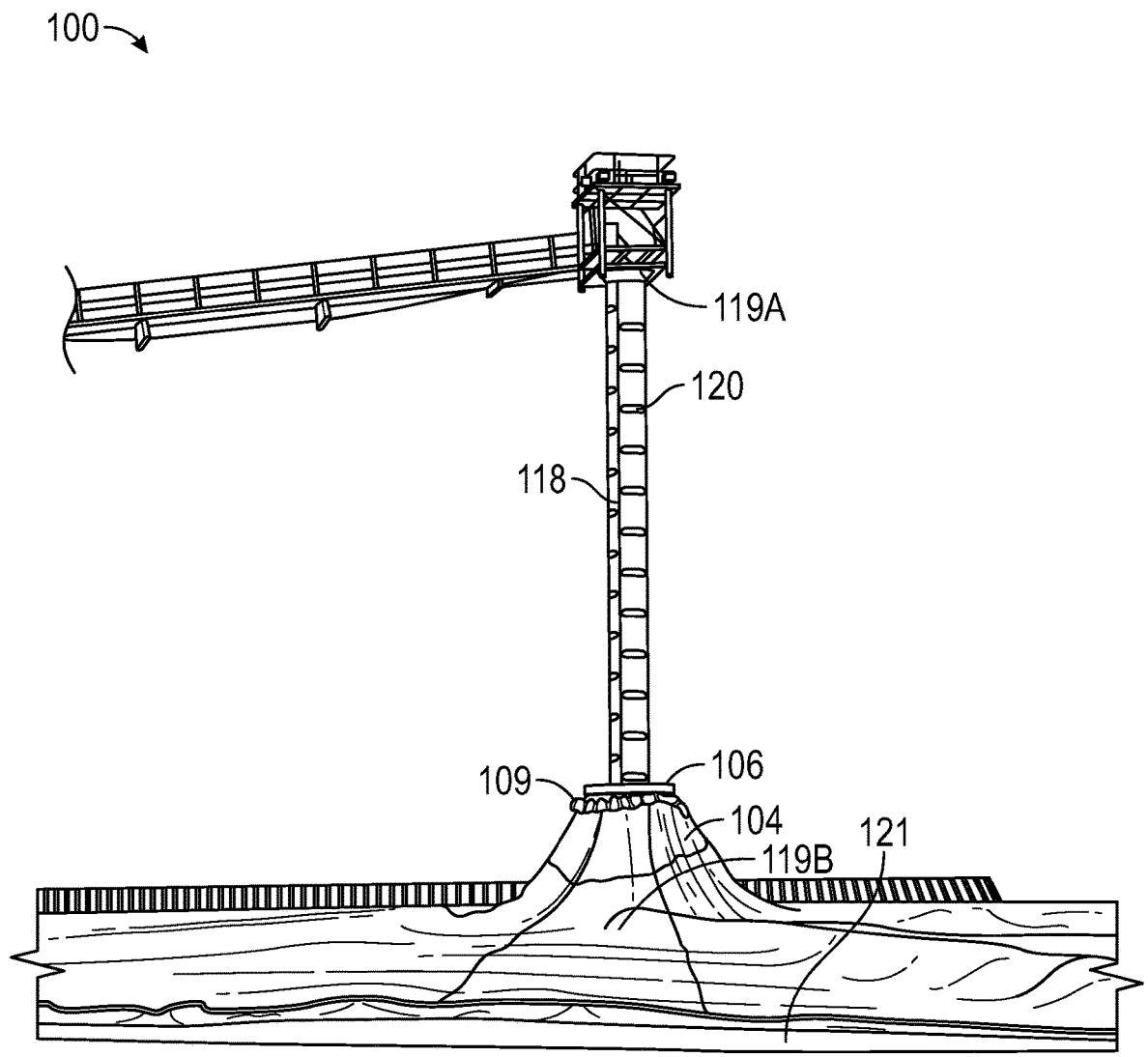
FIG. 4 is a pictorial representation of another fill under tarp configuration.

The center tower skirt 102 can be an optional feature based on the type of tower structure 111. For example, as shown in FIG. 4, a center tower structure 118 with mechanical steel doors 120 can be used in place of the center tower skirt 102. The center tower structure 118 has a top end 119A operably secured to the tower structure 111 and a bottom end 119B operably supported by the ground 121. The tarp 100 is hoisted from the bottom end 119B toward the top end 119A and supported vertically near the top end 119A with cables 114 connected to and extending between the tower structure 111 and the lift ring 106. In this configuration, grain travels along the grain conveyor 113 supported by the tower structure 111 and is fed through the center tower structure 118, from the top end 119A toward the bottom end 119B, out the mechanical steel doors 120 generally in ascending order, and into the conically shaped volume underneath the tarp 100. The tarp 100 is generally conical in shape and generally has a preferred angle of 21 degrees or thereabout relative to horizontal, as shown in FIG. 1, when the tarp 100 is hoisted and supported vertically and the conical volume underneath the tarp 100 is filled.

The body 128 of tarp 100 is often assembled from multiple sections of tarp material, which are typically separately manufactured and joined at a seam during the assembly process to form the fill under tarp 100. The body 128 of the tarp 100 is further detailed in the proceeding description.

The yoke 104 is generally fabricated from a thicker material and offers additional strength over the material forming the body 128 of the tarp 100. The yoke 104 is also typically square in shape whereas the assembled body 128 of the tarp 100 is generally conical in shape. The yoke 104 is generally more expensive than the body 128 of the tarp 100 due to the type, thickness, and construction of the yoke 104. The yoke 104 generally constitutes less than half of the area of the body 128 of the tarp 100. Most often the yoke 104 constitutes less than 30% of the area of the body 128 of the tarp 100. Increasing the size of the yoke 104 relative to the body 128 of the tarp 100 can significantly increase the cost of the fill under tarp 100. The yoke 104 can be fabricated in shapes other than a square shape, such as a shape without corners or one with obtuse angles. For example, the yoke 104 is fabricated having outer edges, such as a circular outer circumference, larger in diameter than the inner edge 109 of yoke 104. Additionally, the yoke 104 can be fabricated having an outer edge with a polygonal outer circumference. In a preferred aspect, the yoke 104 is square shaped for ease of manufacturability, increased strength, to align corners of the yoke 104 with seams between the different tarp sections of the body 128 of the tarp 100, and to position the transition seam 110 away from the inner edge 109 of the yoke 104. In another preferred aspect, the yoke 104 is oriented relative to the different tarp sections of the body 128 of the tarp 100 to intentionally position portions of the yoke 104 and transition seam 110 that are likely to experience higher stress, such as during use, furthest away from the inner edge 109 of yoke 104. For purposes of the disclosure, seam is defined as the joint between and joining of two of the same types of material, whereas transitional seam is defined as the joint between and the joining of two different types of material. Joints between two types of the same or different materials can be joined using stitching, welding together with heat, and/or securing together with an adhesive, or other means.

The yoke 104 is secured to each section of the body 128 of the tarp 100 at a transition seam 110. Joining the material of the yoke 104 with the material for each section of the body 128 of the tarp 100 can be achieved by sewing together with stitching, welding together with heat, and/or securing together with an adhesive. The body 128 of the tarp 100 can be configured and assembled from any number of tarp sections. Thus, in at least one aspect, the yoke 104 is secured to each of the any number of tarp sections at the transition seam 110. In one configuration, tarp quarter sections 108A, 108B, 108C, 108D are secured or assembled at seams 112A, 112B, 112C, 112D to form the body 128 of the tarp 100. Each tarp section 108A, 108B, 108C, 108D is generally assembled from a plurality of commonly aligned and commonly extending tarp panels 114. Thus, the tarp panels 114 have at least one side and/or end secured to the yoke 104 at the transition seam 110. The tarp panels 114 may not be commonly aligned and commonly extending in at least one aspect, but each panel 114 still has at least one side and/or end secured to the yoke 104 at the transition seam 110.

Figure 9:
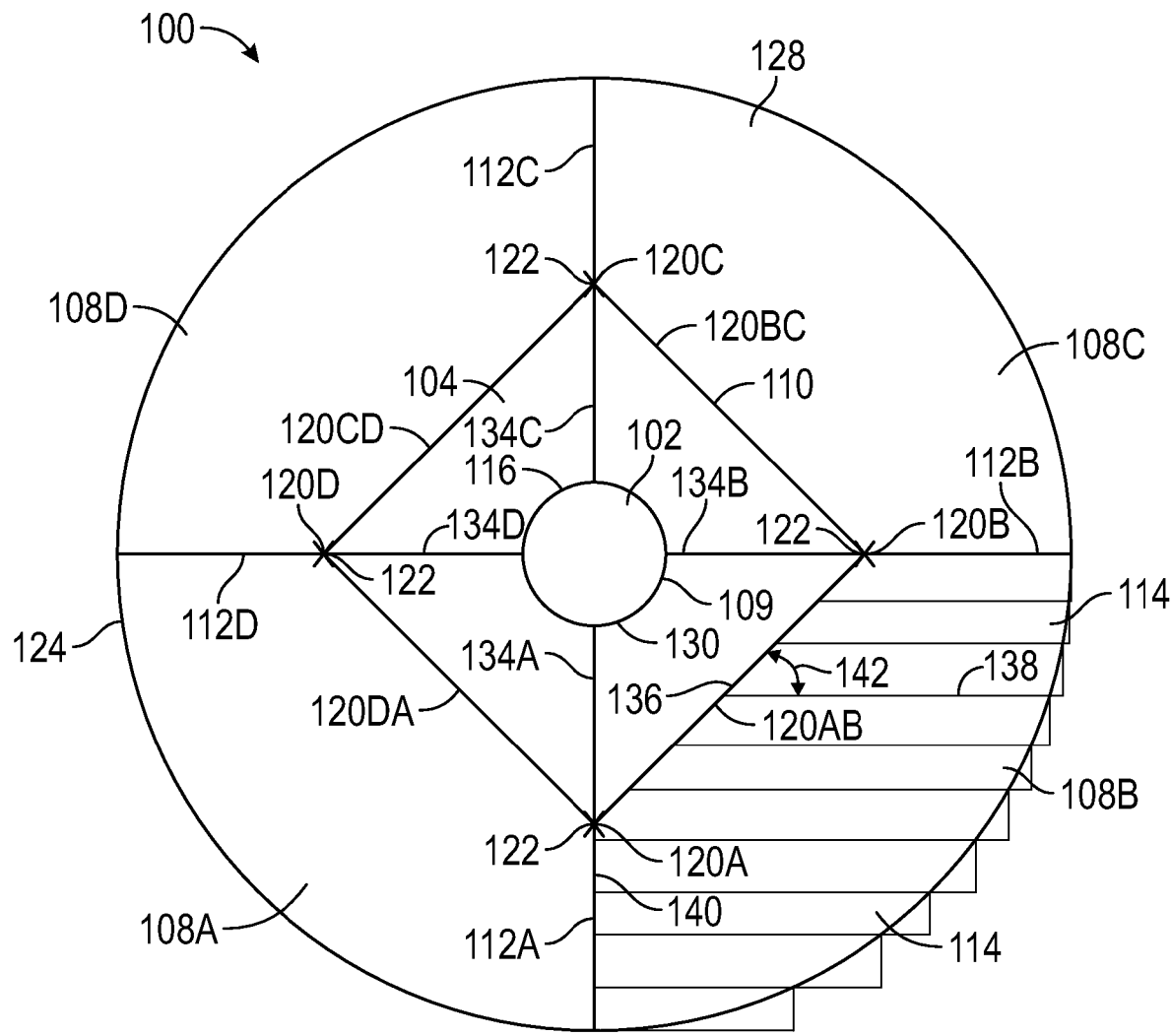
FIG. 9 is a pictorial representation shown from a top view perspective illustrating another yoke configuration for a fill under tarp.
Figure 10:
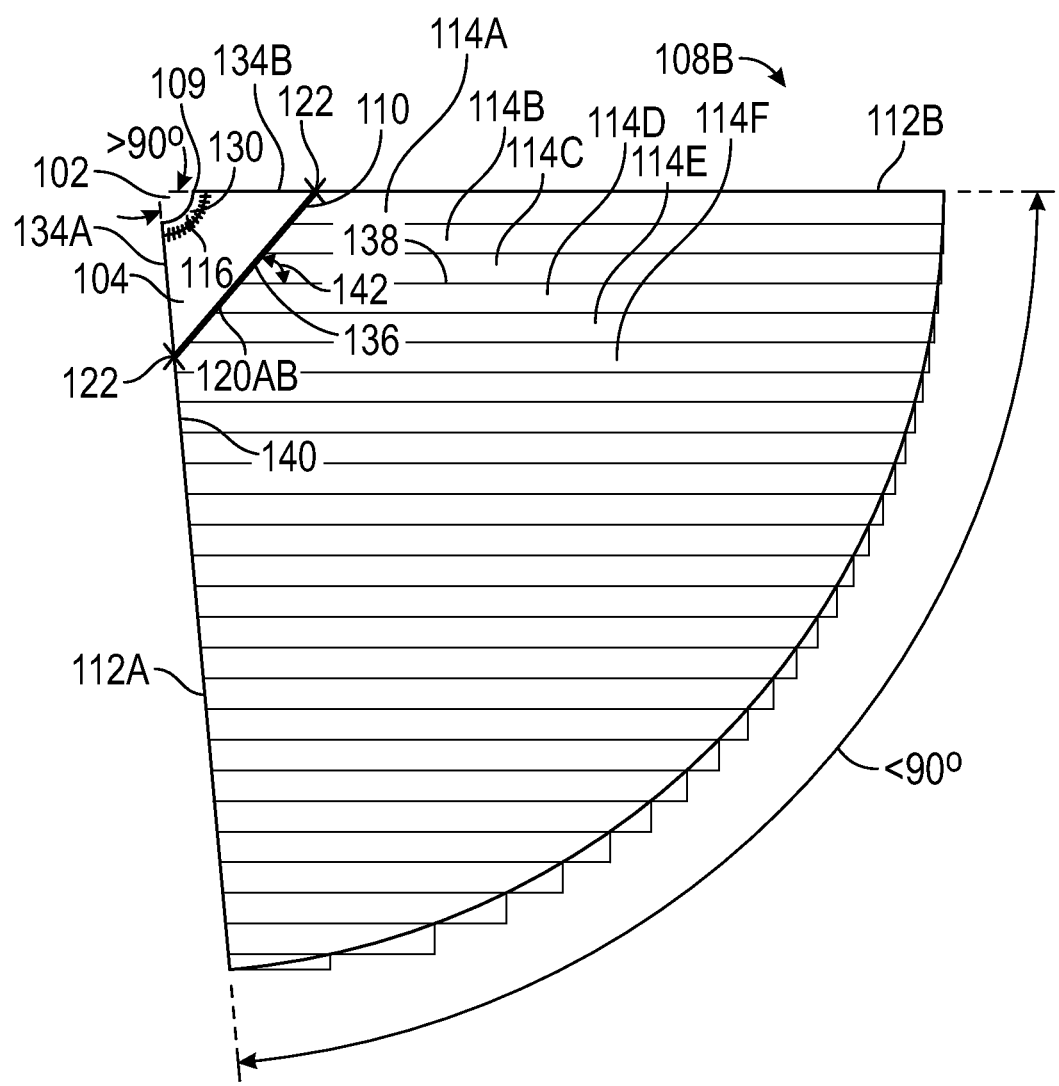
FIG. 10 is a pictorial representation of a yoke and corresponding tarp section.

The orientation of the yoke 104 relative to each tarp section and each panel 114 ultimately determines the number of tarp panels 114 and the length of the edge of each tarp panel 114 that is connected to the yoke 104 at the transition seam 110. In a preferred aspect, the yoke 104 orientation is configured to increase the number of tarp panels 114 and the length of the edge of each tarp panel 114 that is connected to the yoke 104 at the transition seam 110 to increase the strength of and lessen the likelihood of failure at the transition seam 110. FIGS. 9-10 provide an illustration for orienting a square shaped yoke 104 relative to each tarp section 108A, 108B, 108C, 108D and panels 114.

Figure 5:
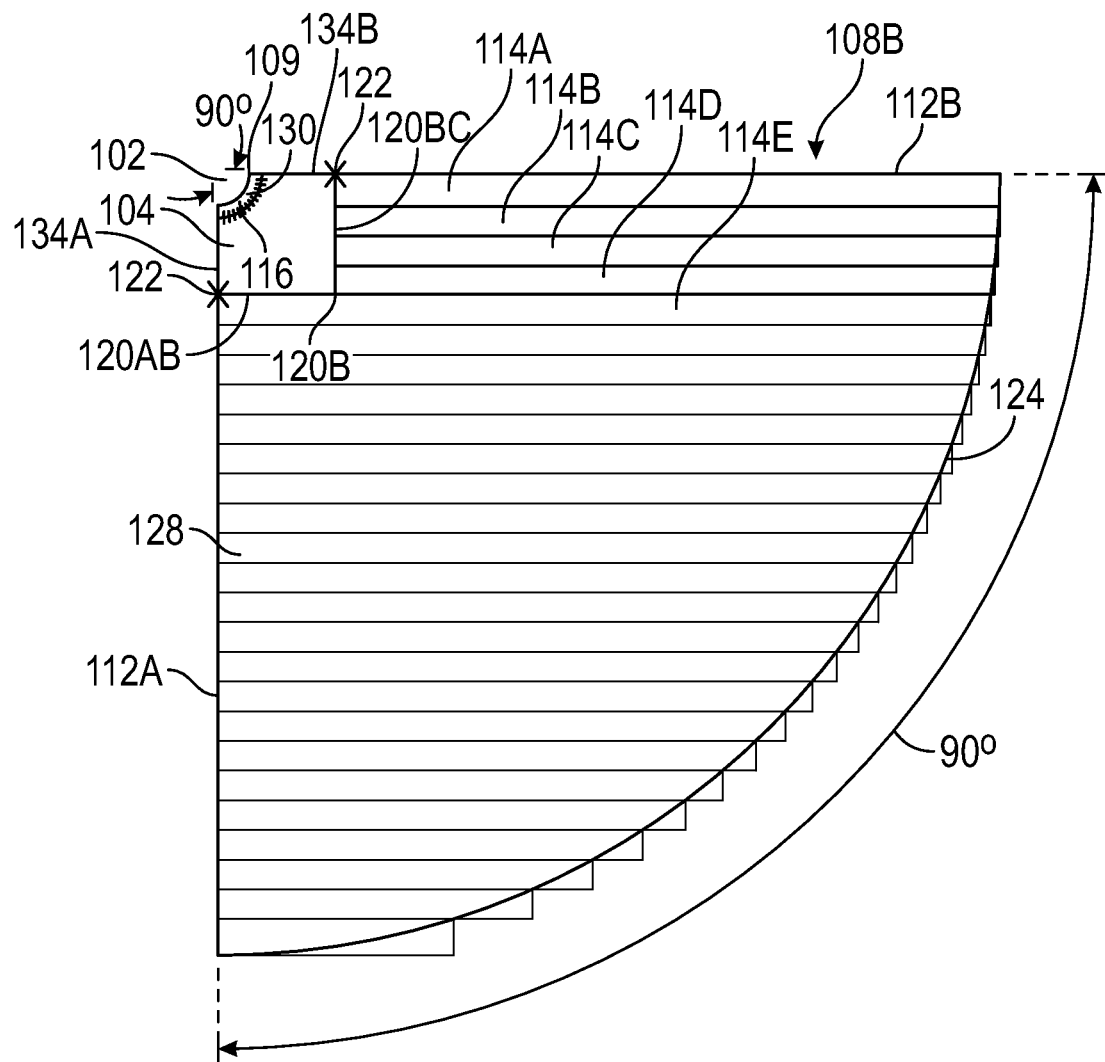
FIG. 5 is a pictorial representation of a tarp section.

The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to each tarp quarter section 108A, 108B, 108C, 108D. For example, FIG. 5 provides an illustration presenting a single section 108B of the body 128 of a fill under tarp 100 for simplification purposes. In a preferred aspect, the other sections of the body 128 of the tarp 100 are generally identical (e.g., see, for example, FIGS. 8-9) and thus are not illustrated in FIGS. 5-6. In another aspect, the other sections of the body 128 of the tarp 100 can be configured differently from one another. Looking at a single quarter section 108B of tarp 100, as shown in FIG. 5, a total of five tarp panels 114A-114E are connected to the yoke 104 along the transition seam at the edge 120BC and the edge 120AB of the yoke 104. Tarp panels 114A-114D are connected to the edge 120BC of the yoke 104 at transition seam 110. Tarp panel 114E is connected to the edge 120AB of the yoke 104 at transition seam 110. In one aspect, the length of transition seam 110 corresponding to the edge 120AB and edge 120BC of the yoke 104 are equal. In another aspect, the length of transition seam 110 corresponding to the edge 120AB and 120BC of the yoke 104 are unequal.

For example, the length of the edge 120BC of the yoke 104 at the transition seam 110 is secured to each of the lengths of the edge of the four panels 114A-114D, whereas the length of the edge 120AB of the yoke 104 at the transition seam 110 is secured to a side edge of the single panel 114E. In this configuration, the load and resulting stresses present during use of the fill under tarp 100 at the edge 120BC of the transition seam 110 is generally carried by each of the lengths of the edge of the four panels 114A-114D. Likewise, the load and the resulting stresses present during use of the fill under tarp 100 at the edge 120AB of the transition seam 110 is generally carried by a side edge of the single panel 114E. The number of tarp panels 114 connected to the edges (e.g., 120AB, 120BC, 120CD, and 120DA) of the yoke 104 at transition seam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented to maximize the number of tarp panels 114 connected to the yoke 104 to increase the strength of transition seam 110. In another preferred aspect, the yoke 104 is configured and/or oriented to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110.

Figure 6:
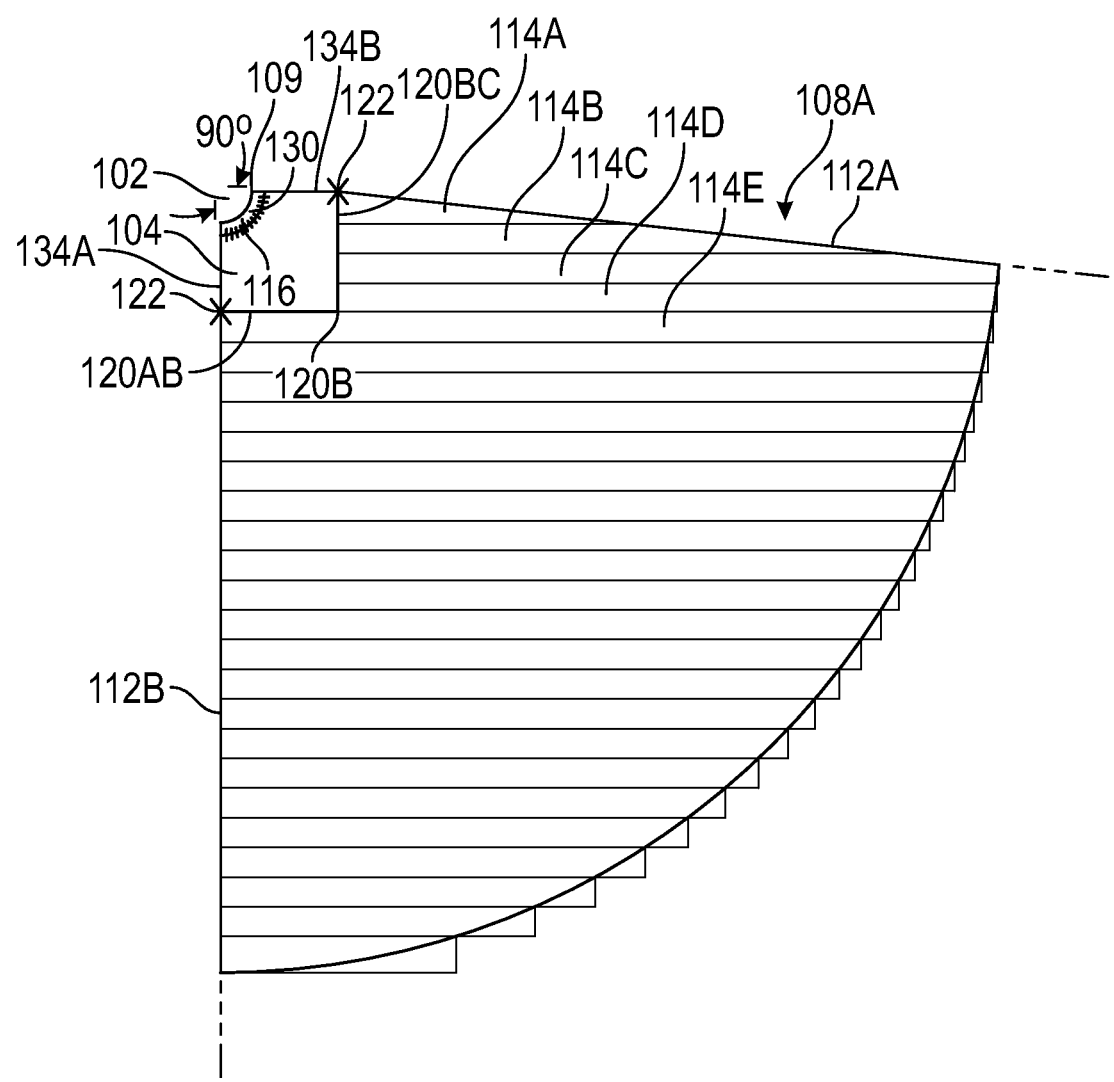
FIG. 6 is another pictorial representation of a tarp section.

Section 108B of the body 128 and yoke 104 of the tarp 100 is configured, for example, in at least one aspect, with seams 112A and 112B being oriented 90 degrees relative to each other. Sections 108A, 108C, and 108D can be similarly configured. Seams 112A and 112B of both the yoke 104 and tarp body 128 of section 108B can be less than or greater than 90 degrees. Sections 108A, 108C, and 108D can be similarly configured. In at least one preferred aspect, seams 112A and 112B of section 108B of the tarp body 128 are less than 90 degrees and seams 112A and 112B of the yoke 104 are 90 degrees (FIG. 6). Sections 108A, 108C, and 108D can be similarly configured. In at least one other preferred aspect, each seam 112A and 112B are less than 90 degrees for both the yoke 104 and body 128 of section 108B of tarp 100. Sections 108A, 108C, and 108D can be similarly configured. In still another aspect, each section 108A, 108B, 108C, 108D or one or more of each of the sections 108A, 108B, 108C, 108D has seams along the body 128 of tarp 100 that are oriented at 90 degrees, greater than 90 degrees, or less than 90 degrees. In yet another aspect, each section 108A, 108B, 108C, 108D or one or more of each of the sections 108A, 108B, 108C, 108D has seams along the yoke 104 of tarp 100 that are oriented at 90 degrees, greater than 90 degrees, or less than 90 degrees. In another aspect, each section 108A, 108B, 108C, 108D or one or more of each of the sections 108A, 108B, 108C, 108D has seams along both the body 128 and the yoke 104 of tarp 100 that are oriented at 90 degrees, greater than 90 degrees, or less than 90 degrees.

The outer terminal edge 124 defining the outer circumference of the body 128 of tarp 100 can be altered as needed by increasing the length of seams 112A, 112B, 112C, and 112D for each section 108A, 108B, 108C, and 108D. The arc length of each or one or more of each of the sections 108A, 108B, 108C, and 108D can be changed, for example, in at least one aspect, by altering the angle between seams 112A, 112B, 112C, and 112D. The outer circumference of the outer terminal edge 124 of the body 128 of the tarp 100 can be increased and decreased by altering the angle between seams of each or one or more of each of the sections 108A, 108B, 108C, and 108D. For example, decreasing the angle (e.g., less than 90 degrees) between seams of each or one or more of each of the sections 108A, 108B, 108C, and 108D decreases the circumference of the outer terminal edge 124 of the body 128 of the tarp 100. Conversely, increasing the angle (e.g., more than 90 degrees) between seams of each or one or more of each of the sections 108A, 108B, 108C, and 108D increases the circumference of the outer terminal edge 124 of the body 128 of the tarp 100. Increasing the angle between seams of each or one or more of each of the sections 108A, 108B, 108C, and 108D of the body 128 of the tarp 100 increases the amount of material used and increases the circumference of the outer terminal edge 124 of the body 128 of the tarp 100. Conversely, decreasing the angle between seams of each or one or more of each of the sections 108A, 108B, 108C, and 108D of the body 128 of the tarp 100 decreases the amount of material used and decreases the circumference of the outer terminal edge 124 of the body 128 of the tarp 100. In a preferred aspect, the angle between seams of each or one or more of each of the sections 108A, 108B, 108C, and 108D of the body 128 of the tarp 100 is decreased (e.g., less than 90 degrees) to decrease the amount of material used and to decrease the circumference of the outer terminal edge 124 of the body 128 of the tarp 100 and so the overall shape of the body 128 of the fill under tarp 100 better approximates the conical shaped pile of grain.

Figure 7:
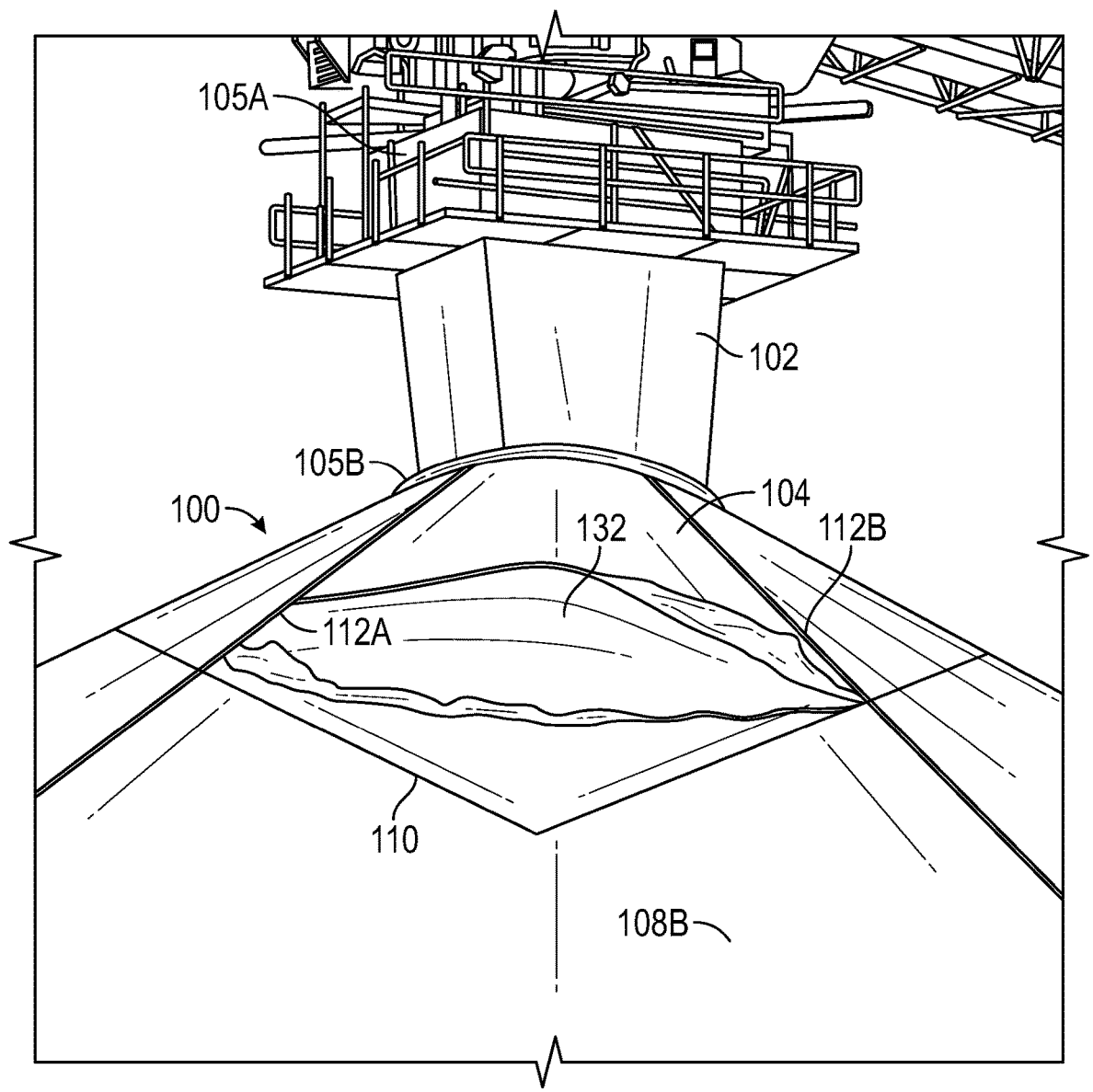
FIG. 7 is a pictorial representation illustrating failure of a fill under tarp.

FIG. 7 provides an illustration showing failure of a fill under tarp 100. In one example, the load and the resulting stresses present during use of the fill under tarp 100 causes separation at one or more of the seams and/or one or more of the transition seams. In FIG. 7, failure points are shown and exist along both seam 112A and transition seam 110. One failure mode can occur when the transition seam 110 separates from the load and resulting stresses present during use of the fill under tarp 100. Another failure mode can occur when the transition seam 110 separates resulting in a separation of seam 112A. Still another failure mode can occur when seam 112B separates from the load and resulting stresses present during use of the fill under tarp 100. Yet another failure mode can occur when seam 112A separates resulting in a separation of transition seam 110. Although seams 112A and 112B are specially referred to in FIG. 7, it is understood that failure could be applicable to any seam (e.g., 112A, 112B, 112C, and 112D) of the fill under tarp 100. Similarly, although transition seam 110 is specifically referred to in FIG. 7, it is understood that transition seam 110 can refer to the transition seam associated with any of the edges (e.g., edges 120AB, 120BC, 120CD, and 120DA) of the fill under tarp 100.

Figure 8:
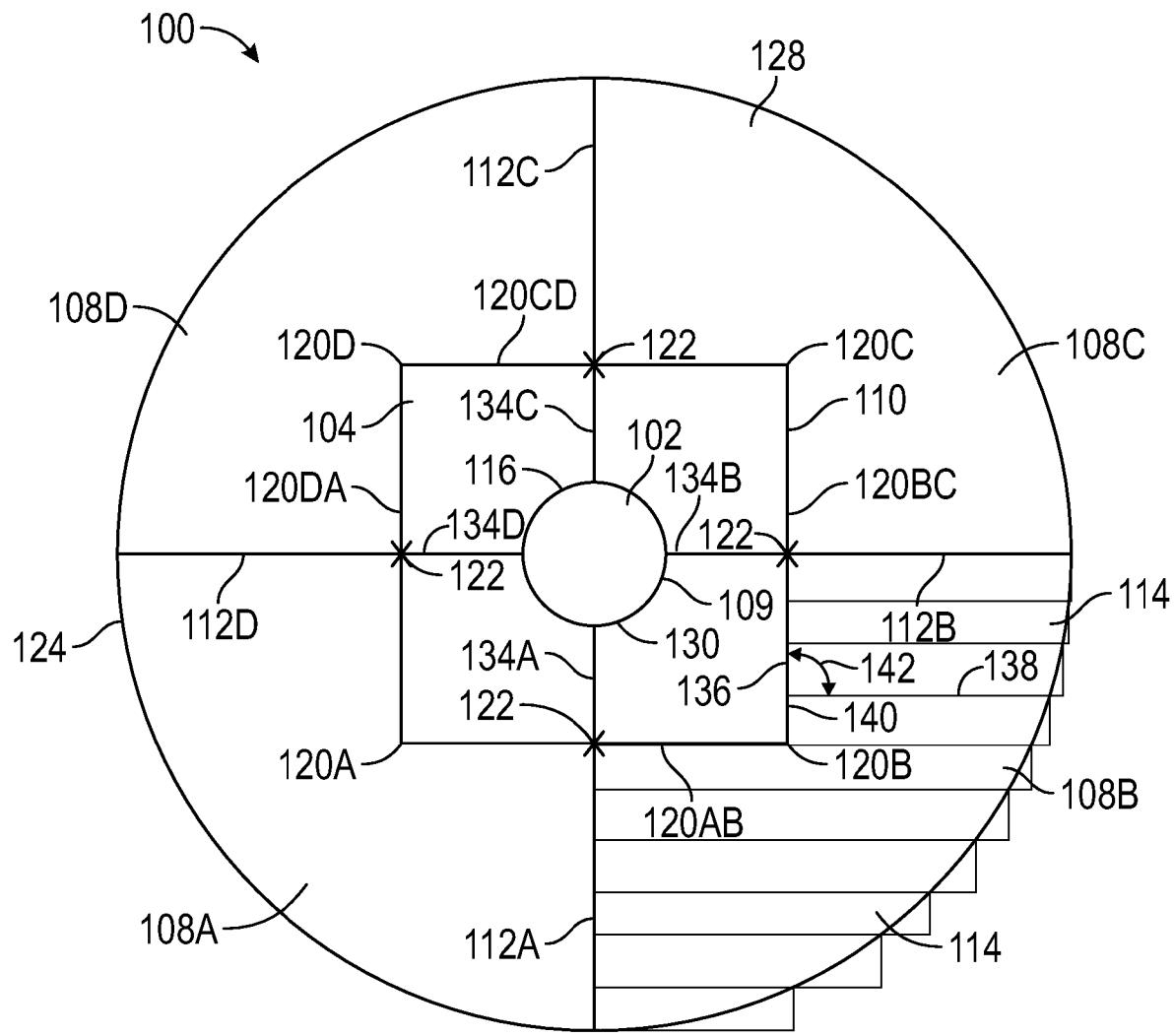
FIG. 8 is a pictorial representation shown from a top view perspective illustrating a yoke configuration for a fill under tarp.

FIG. 8 is a pictorial representation shown from a top view perspective illustrating a configuration for the yoke 104 of a fill under tarp 100. The tarp 100 includes sections 108A, 108B, 108C, and 108D joined at seams 112A, 112B, 112C, and 112D extending from the outer terminal edge 124 of the body 128 of the fill under tarp 100 to the edges (e.g., 120AB, 120BC, 120CD, and 120DA) of the yoke 104 of the fill under tarp 100. The body 128 of the tarp 100 can include any number of sections. In one aspect, the body 128 of the tarp 100 includes more than four sections (e.g., more than sections 108A, 108B, 108C, and 108D). In another aspect, the body 128 of the tarp 100 includes less than four sections (e.g., less than sections 108A, 108B, 108C, and 108D). Each section is configured from panels 114 (FIG. 8). The yoke 104 is generally configured as a separate member of the body 128 of the tarp 100, and typically fabricated from a different type of material than sections 108A, 108B, 108C, and 108D of the body of the tarp 100. The yoke 104 can be circular, oval, rectangular, or polygonal in shape and is preferably square in shape. The yoke 104 can include yoke seams 134A, 134B, 134C, and 134D extending between the inner edge 109 and respective corners 120A, 120B, 120C, and 120D. The yoke 104 includes edge 120AB spaced and extending between corner 120A and corner 120B, edge 120BC spaced and extending between corner 120B and corner 120C, edge 120CD spaced and extending between corner 120C and corner 120D, and edge 120DA spaced and extending between corner 120D and corner 120A. The yoke 104 includes an opening 130 disposed at the center of the body 128 of the tarp 100. The opening 130 can be spaced equidistant between opposing edges 120BC and 120DA and opposing edges 120AB and 120CD. In one aspect, the inner edge 109 of the opening 130 of the yoke 104 is colinear with the inner edge 116 of the body 128 of tarp 100. In other aspects, the inner edge 109 of the opening 130 is not colinear with the inner edge 116 of the body 128 of the tarp 100. The yoke 104 is positioned and configured relative to the body 128 of the tarp 100 whereby a portion of edge 120AB and a portion of edge 120BC lie in section 108B, whereby a portion of edge 120BC and a portion of edge 120CD lie in section 108C, whereby a portion of edge 120CD and a portion of edge 120DA lie in section 108D, and whereby a portion of edge 120DA and a portion of edge 120AB lie in section 108A. Edge 120AB is joined to section 108A and section 108B along transition seam 110, edge 120BC is joined to section 108B and section 108C along transition seam 110, edge 120CD is joined to section 108C and section 108D along transition seam 110, and edge 120DA is joined to section 108D and section 108A along transition seam 110. The yoke 104 can be layered, for example, on top of or beneath the body 128 of tarp 100. In another aspect, the yoke 104 is not layered with the body 128 of tarp 100. For example, seam 112A can be configured to extend from the outer terminal edge 124 of the body 128 of the tarp 100 to the edge 120AB of the yoke 104, seam 112B can be configured to extend from the outer terminal edge 124 of the body 128 of the tarp 100 to the edge 120BC of the yoke 104, seam 112C can be configured to extend from the outer terminal edge 124 of the body 128 of the tarp 100 to the edge 120CD of the yoke 104, and seam 112D can be configured to extend from the outer terminal edge 124 of the body 128 of the tarp 100 to the edge 120DA of the yoke 104. Similarly, the yoke 104 of the tarp 100 can be configured whereby the edges 120AB, 120BC, 120CD, and 120DA are colinear with and joined along the transition seam 110 with respective sections 108B, 108C, 108D, and 108A. The orientation of the yoke 104 relative to the body 128 of the tarp 100 determines the distance of the transition seam 110 from the inner edge 109 of the yoke 104 of the tarp 100. Additionally, the orientation of the yoke 104 relative to the body 128 of the tarp 100 determines the distance from the intersection point marked by the "X" 122 between the transition seam 110 and the seams 112A, 112B, 112C, and 112D and the inner edge 109 of the yoke 104 of the tarp 100. As mentioned herein, one failure mode can occur when the transition seam 110 separates from the load and resulting stresses present during use of the fill under tarp 100. Another failure mode can occur when the transition seam 110 separates resulting in a separation and failure of seam 112B or other seams. Still another failure mode can occur when seam 112B or other seams separate from the load and resulting stresses present during use of the fill under tarp 100. Yet another failure mode can occur when seam 112B or other seams separate resulting in a separation of transition seam 110. As shown in FIG. 5 and FIG. 8, the corner 120B is disposed further away from the inner edge 109 of the yoke 104 than the intersection points "X" 122 between the transition seam 110 and the seams 112A, 112B, 112C, and 112D. Positioning the intersection point "X" 122 further away from the inner edge 109 of the yoke 104 or closer to the outer terminal edge 124 of the body 128 of the tarp 100 significantly reduces the chance of failure of the tarp 100 from the load that results from the stresses present during use of the fill under tarp 100. FIG. 5 pictorially illustrates the panels 114 (e.g., 114A, 114B, 114C, 114D, 114E) for each of the sections 108A, 108B, 108C, and 108D of the body 128 of the tarp 100 shown in FIG. 8. The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to section 108A, 108B, 108C, and 108D. In at least one aspect, the angled edge 136 of each tarp panel 114 connected to the yoke 104 has an angle 142 equal to or less than 90 degrees relative to the longitudinal edge 138 of each tarp panel 114. For example, the angle 142 of the angled edge 136 of each tarp panel 114 joined to the yoke 104 can be 90 degrees relative to the longitudinal edge 138 of each tarp panel 114 but is preferably less than 60 degrees and greater than 30 degrees. The longitudinal edge 138 of each tarp panel 114 can be parallel with seam 112B and the lateral edge 140 can be perpendicular with seam 112A. The same relationships for the lateral 140 and longitudinal edges 138 with seams 112A, 112B, 112C, and 112D applies to the other sections 108A, 108C, and 108D. Looking at a single quarter section 108B of tarp 100, as shown in FIG. 5, a total of five tarp panels 114A-114E are connected to the yoke 104 along the transition seam at the edge 120BC and the edge 120AB of the yoke 104. In at least one aspect, tarp panels 114A-114D are connected to the edge 120BC of the yoke 104 at transition seam 110, and tarp panel 114E is connected to the edge 120AB of the yoke 104 at transition seam 110. In one aspect, the length of transition seam 110 corresponding to the edge 120AB and edge 120BC of the yoke 104 are equal. In another aspect, the length of transition seam 110 corresponding to the edge 120AB and 120BC of the yoke 104 are unequal. For example, the length of the edge 120BC of the yoke 104 at the transition seam 110 is secured to each of the lengths of the edge of the four panels 114A-114D, whereas the length of the edge 120AB of the yoke 104 at the transition seam 110 is secured to a side edge of the single panel 114E. In this configuration, the load and resulting stresses present during use of the fill under tarp 100 at the edge 120BC of the transition seam 110 is generally carried by each of the lengths of the edge of the four panels 114A-114D. Likewise, the load and the resulting stresses present during use of the fill under tarp 100 at the edge 120AB of the transition seam 110 is generally carried by aside edge of the single panel 114E. The number of tarp panels 114 connected to the edges (e.g., 120AB, 120BC, 120CD, and 120DA) of the yoke 104 at transition seam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented to maximize the number of tarp panels 114 connected to the yoke 104 to increase the strength of transition seam 110. In another preferred aspect, the yoke 104 is configured and/or oriented to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110.

FIG. 9 is a pictorial representation shown from a top view perspective illustrating a configuration for the yoke 104 of a fill under tarp 100. The tarp 100 includes sections 108A, 108B, 108C, and 108D joined at seams 112A, 112B, 112C, and 112D extending from the outer terminal edge 124 of the body 128 of the fill under tarp 100 to the edges (e.g., 120AB, 120BC, 120CD, and 120DA) of the body 128 of the fill under tarp 100. The yoke 104 can include yoke seams 134A, 134B, 134C, and 134D extending between the inner edge 109 and respective corners 120A, 120B, 120C, and 120D. The body 128 of the tarp 100 can include any number of sections. In one aspect, the body 128 of the tarp 100 includes more than four sections. In another aspect, the body 128 of the tarp 100 includes less than four sections. Each section is configured from panels 114. The yoke 104 can be circular, oval, rectangular, or polygonal in shape and is preferably square in shape. The yoke 104 includes edge 120AB spaced and extending in section 108B between corner 120A and corner 120B, edge 120BC spaced and extending in section 108C between corner 120B and corner 120C, edge 120CD spaced and extending in section 108D between corner 120C and corner 120D, and edge 120DA spaced and extending in section 108A between corner 120D and corner 120A. The yoke 104 includes an opening 130 disposed at the center of the body 128 of the tarp 100. The opening 130 can be spaced equidistant between opposing edges 120BC and 120DA and opposing edges 120AB and 120CD. In one aspect, the inner edge 109 of the opening 130 of the yoke 104 is colinear with the inner edge 116 of the body 128 of tarp 100. In other aspects, the inner edge 109 of the opening 130 is not colinear with the inner edge 116 of the body 128 of the tarp 100. The yoke 104 is positioned and configured relative to the body 128 of the tarp 100 whereby the edge 120AB lies in section 108B, whereby the edge 120BC lies in section 108C, whereby the edge 120CD lies in section 108D, and whereby the edge 120DA lies in section 108A. In at least one preferred aspect, section 108B extends from the outer terminal edge 124 and terminates at the edge 120AB, section 108C extends from the outer terminal edge 124 and terminates at the edge 120BC, section 108D extends from the outer terminal edge 124 and terminates at the edge 120CD, and section 108A extends from the outer terminal edge 124 and terminates at the edge 120DA. Edge 120AB is joined to section 108B along transition seam 110, edge 120BC is joined to section 108C along transition seam 110, edge 120CD is joined to section 108D along transition seam 110, and edge 120DA is joined to section 108A along transition seam 110. The yoke 104 can be layered, for example, on top of or beneath the body 128 of tarp 100. In another aspect, the yoke 104 is not layered with the body 128 of tarp 100. The yoke 104 can be connected with each section at respective edges 120AB, 120BC, 120CD, and 120DA. For example, seam 112A can be configured to extend from the outer terminal edge 124 of the body 128 of the tarp 100 to the intersection point "X" 122 of edge 120AB and edge 120DA of the yoke 104, seam 112B can be configured to extend from the outer terminal edge 124 of the body 128 of the tarp 100 to the intersection point "X" 122 of edge 120BC and edge 120AB of the yoke 104, seam 112C can be configured to extend from the outer terminal edge 124 of the body 128 of the tarp 100 to the intersection point "X" 122 of edge 120CD and edge 120BC of the yoke 104, and seam 112D can be configured to extend from the outer terminal edge 124 of the body 128 of the tarp 100 to the intersection point "X" 122 of edge 120DA and edge 120CD of the yoke 104. Similarly, the body 128 of tarp 100 can be configured whereby each section has edges colinear with and joined to the edge 120AB in section 108B, the edge 120BC in section 108C, the edge 120CD in section 108D, and the edge 120DA in section 108A. The orientation of the yoke 104 relative to the body 128 of the tarp 100 determines the distance of the transition seam 110 from the inner edge 109 of the yoke 104 of the tarp 100. For example, the orientation of the yoke 104 shown in FIG. 9 is rotated 45 degrees relative to the orientation of the yoke 104 shown in FIG. 8. The yoke 104 can be rotated greater than 45 degrees or less than 45 degrees, as needed, to position the intersection point "X" 122 further away from the inner edge 109 of the yoke 104 or closer to the outer terminal edge 124 of the body 128 of the tarp 100. In the configuration shown in FIG. 9, the yoke 104 is rotated whereby the intersection points "X" 122 aligned with each seam are positioned furthest away from the inner edge 109 of the yoke 104, whereas the transition seam 110 can be closer to the inner edge 109 of the yoke 104 between any two intersection points "X" 122. In one aspect, diagonals of a square-shaped yoke 104 align with seams 112A, 112B, 112C, and 112D. Additionally, the orientation of the yoke 104 relative to the body 128 of the tarp 100 determines the length of the transition seam 110 between any two intersection points "X" 122. In a preferred aspect, the yoke 104 is rotated so that the largest amount of length (e.g., linear length) of the transition seam 110 is disposed in any one single section of the body 128 of the fill under tarp 100. As mentioned herein, one failure mode can occur when the transition seam 110 separates from the load and resulting stresses present during use of the fill under tarp 100. Another failure mode can occur when the transition seam 110 separates resulting in a separation and failure of one or more of the seams (e.g., 112A, 112B, 112C, and 112D). Still another failure mode can occur when one or more of the seams (e.g., 112A, 112B, 112C, and 112D) separate from the load and resulting stresses present during use of the fill under tarp 100. Yet another failure mode can occur when one or more of the seams (e.g., 112A, 112B, 112C, and 112D) separate resulting in a separation of the transition seam 110 at one or more locations. As shown in FIG. 9 and FIG. 10, the corners 120A, 120B, 120C, and 120D are disposed further away from the inner edge 109 of the yoke 104 and are colinear with the intersection points "X" 122 representing the intersection between transition seam 110 and the seams 112A, 112B, 112C, and 112D. Positioning the intersection point "X" 122 further away from the inner edge 109 of the yoke 104 or closer to the outer terminal edge 124 of the body 128 of the tarp 100 significantly reduces the chance of failure of the tarp 100 from the load that results from the stresses present during use of the fill under tarp 100. FIG. 9 pictorially illustrates the panels 114 shown in section 108B. Similar panels 114, although not shown, would be present in all sections 108A, 108B, 108C, and 108D of the body 128 of the tarp 100. The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to section 108A, 108B, 108C, and 108D. Looking at a single quarter section 108B of tarp 100, as shown in FIG. 9, a total of six tarp panels 114 are connected to the yoke 104 along the transition seam at the edge 120AB of the yoke 104. In at least one aspect, the angled edge 136 of each tarp panel 114 connected to the yoke 104 has an angle 142 less than 90 degrees relative to the longitudinal edge 138 of each tarp panel 114. For example, the angle 142 of the angled edge 136 of each tarp panel 114 joined to the yoke 104 can be 45 degrees relative to the longitudinal edge 138 of each tarp panel 114. The longitudinal edge 138 of each tarp panel 114 can be parallel with seam 112B and the lateral edge 140 can be perpendicular with seam 112A. The same relationships for the lateral 140 and longitudinal edges 138 with seams 112A, 112B, 112C, and 112D applies to the other sections 108A, 108C, and 108D. In at least one aspect, the terminal end of each of the six tarp panels 114 are connected to the edge 120AB of the yoke 104 at transition seam 110. In one aspect, the length of transition seam 110 corresponding to the respective edges 120AB, 120BC, 120CD, and 120DA of the yoke 104 are equal. In another aspect, the length of transition seam 110 corresponding to the respective edges 120AB, 120BC, 120CD, and 120DA of the yoke 104 are unequal. For example, the length of the edge 120AB of the yoke 104 at the transition seam 110 is secured to the terminal ends of each of the six panels 114. In this configuration, the load and resulting stresses present during use of the fill under tarp 100 at the edge 120BC of the transition seam 110 is generally carried by each of the lengths of the edge of the six panels 114. The number of tarp panels 114 connected to the edges (e.g., 120AB, 120BC, 120CD, and 120DA) of the yoke 104 at transition seam 110 can be increased by changing the orientation of the yoke 104 relative to the body 128 of the tarp 100. Similarly, the number of tarp panels 114 connected to the edges (e.g., 120AB, 120BC, 120CD, and 120DA) of the yoke 104 at transition seam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented, such as in FIG. 9 and FIG. 10, to maximize the number of tarp panels 114 connected to the yoke 104 to increase the strength of transition seam 110. In another preferred aspect, the yoke 104 is configured and/or oriented, such as in FIG. 9 and FIG. 10, to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110. In at least one aspect, the terminal ends of a total of six tarp panels 114 are connected to the yoke 104 at the transition seam 110 where both the yoke 104 and the body 128 have an angle between seams that is less than 90 degrees. In at least one specific aspect, the terminal ends of a total of six tarp panels 114 are connected to the yoke 104 at the transition seam 110 where both the yoke 104 and the body 128 have an angle between seams that is equal to 85 degrees.

FIG. 5, FIG. 6, and FIG. 10 provide illustrations presenting additional aspects of the fill under tarp 100. As discussed herein, the body 128 of the tarp 100 can be configured from one or more sections (e.g., 108A, 108B, 108C, and 108D). One or more sections of the body 128 of the tarp 100 can have an angle between seams of the yoke that are equal to, less than, or greater than 90 degrees. One or more sections of the body 128 of the tarp 100 can have an angle between seams of the body 128 that are equal to, less than, or greater than 90 degrees. One or more sections of the body 128 of the tarp 100 can have an angle between seams 134A, 134B, 134C, and 134D extending between the inner edge 109 and respective corners 120A, 120B, 120C, and 120D of the yoke that are equal to 90 degrees, whereas the angle between the seams of the body 128 are not equal to 90 degrees and vice-versa. One or more sections of the body 128 of the tarp 100 can have an angle between seams 134A, 134B, 134C, and 134D extending between the inner edge 109 and respective corners 120A, 120B, 120C, and 120D of the yoke that are less than 90 degrees, whereas the angle between the seams of the body 128 are not less than 90 degrees and vice-versa. One or more sections of the body 128 of the tarp 100 can have an angle between seams 134A, 134B, 134C, and 134D extending between the inner edge 109 and respective corners 120A, 120B, 120C, and 120D of the yoke that are greater than 90 degrees, whereas the angle between the seams of the body 128 are not greater than 90 degrees and vice-versa. For example, FIG. 5 pictorially illustrates a section of the body 128 of the tarp 100 being equal to 90 degrees and the yoke 104 also being equal to 90 degrees. In another example, FIG. 6 pictorially illustrates a section of the body 128 of the tarp 100 being less than 90 degrees, whereas the yoke 104 is equal to 90 degrees. In yet another example, FIG. 10 pictorially illustrates a section of the body 128 of the tarp 100 being less than 90 degrees and the yoke 104 also being less than 90 degrees. In at least one specific aspect, one, or more, or all the sections of the body 128 of the tarp 100 are 85 degrees and the seams 134A, 134B, 134C, and 134D extending between the inner edge 109 and respective corners 120A, 120B, 120C, and 120D of yoke 104 are also 85 degrees. The seams 134A, 134B, 134C, and 134D extending between the inner edge 109 and respective corners 120A, 120B, 120C, and 120D yoke 104 having an angle less than 90 degrees provides an inner edge 109 of the opening 130 that best approximates the circumference of the lift ring 106. In at least one specific example, the seams 134A, 134B, 134C, and 134D extending between the inner edge 109 and respective corners 120A, 120B, 120C, and 120D yoke 104 of each section has an angle of 85 degrees thereby providing an inner edge 109 of the opening 130 that best approximates the circumference of the lift ring 106. The body 128 having an angle less than 90 degrees between seams of one, or more, or all sections provides a fill under tarp 100 having a body 128 that better approximates the conical shape of the grain. In at least one specific example, the body 128 has an angle of 85 degrees between seams thereby providing an fill under tarp 100 having a body 128 that best approximates the conical shape of the grain.

Figure 11A:
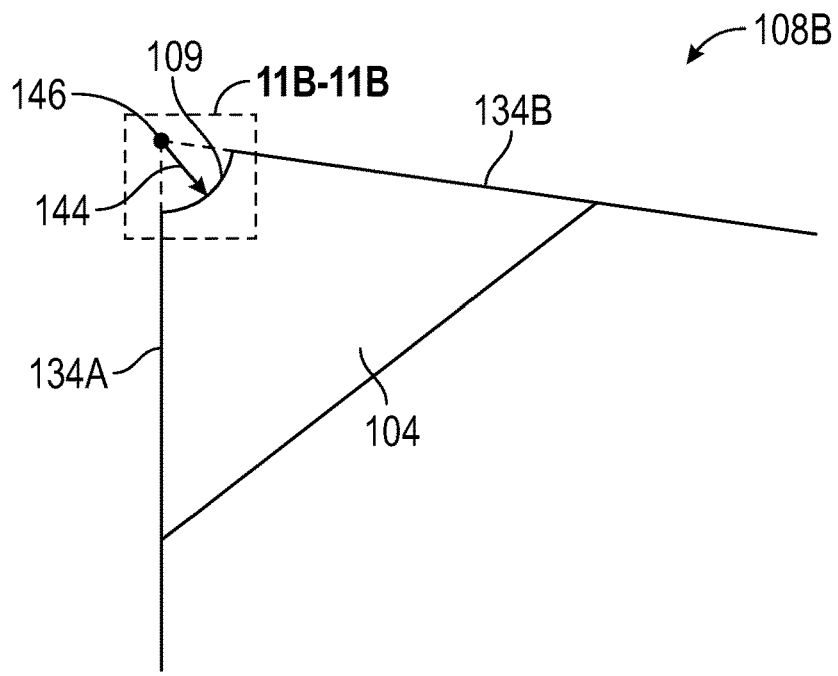
FIGS. 11A-11D are pictorial representations showing calculation of a radius and inner edge of the yoke and tarp section overlap.
Figure 11B:
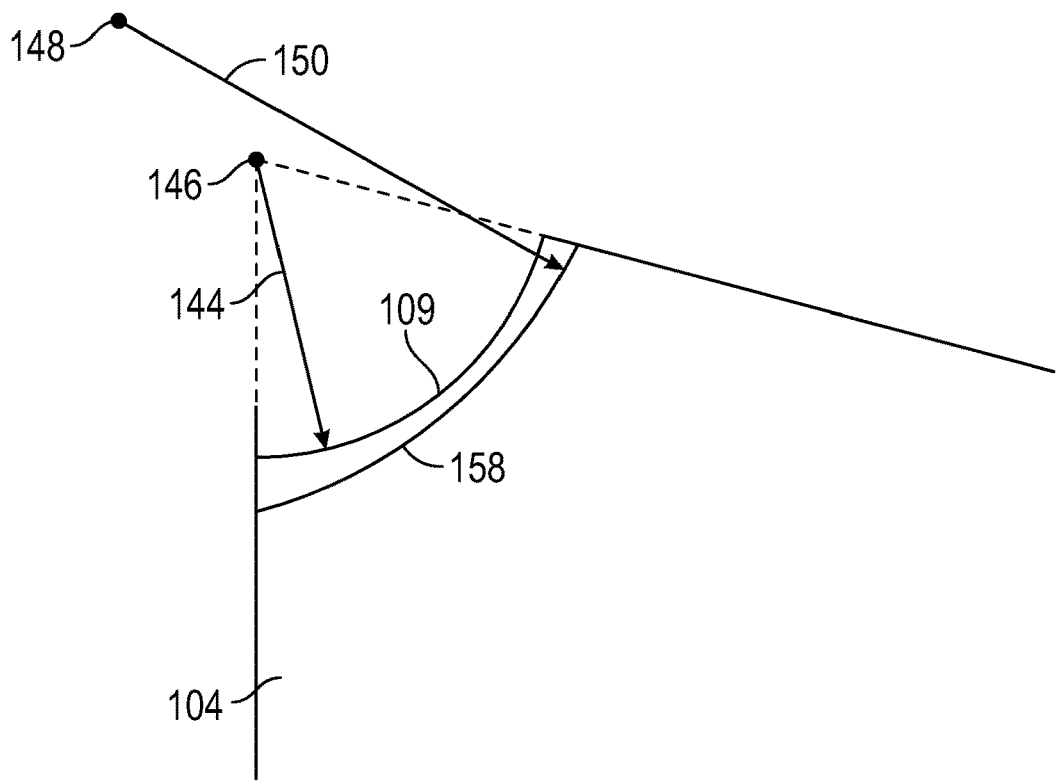
Figure 11C:
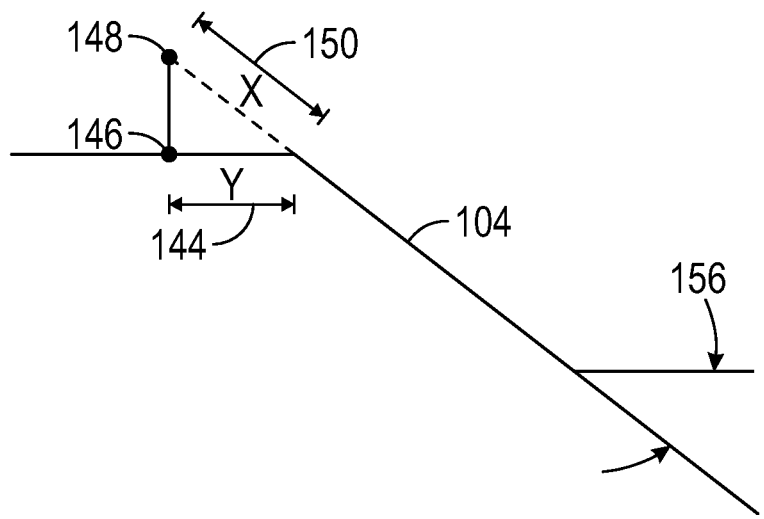
Figure 11D:
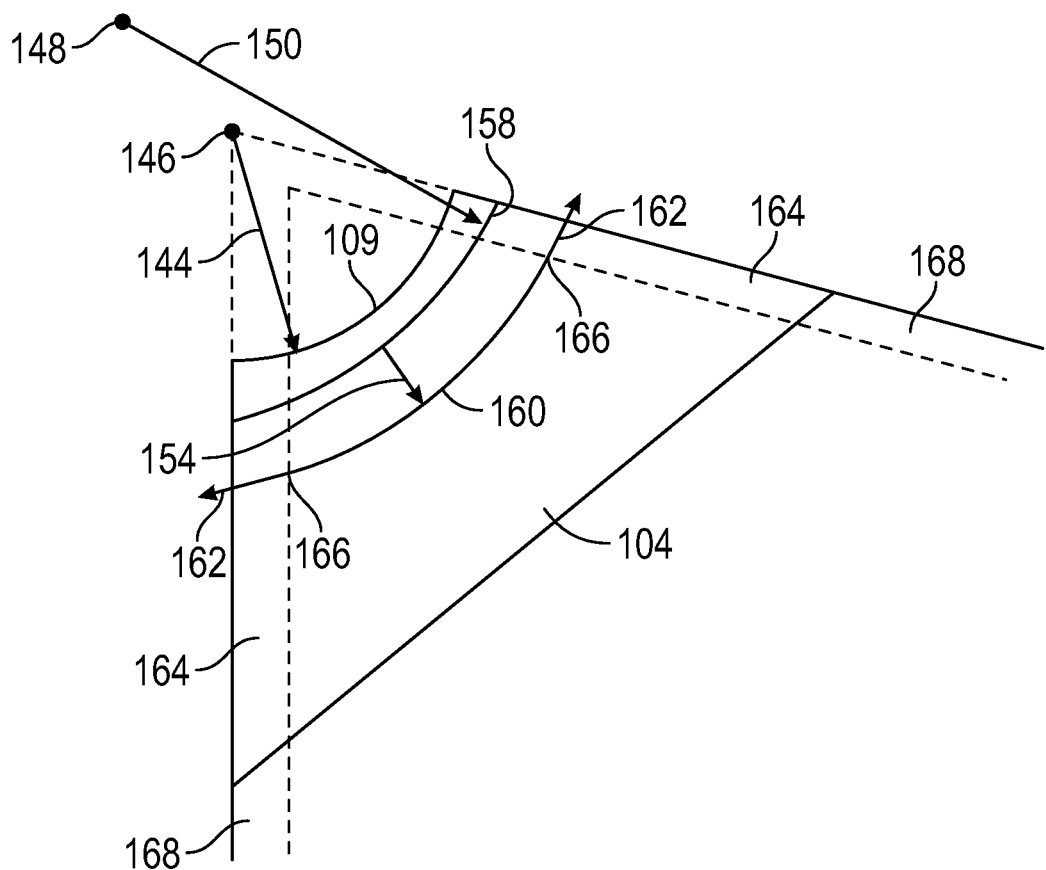

FIGS. 11A-11D are pictorial representations showing calculation of a radius and inner edge and/or arc of the yoke and tarp section overlap. Referring to the figures, FIG. 11A is a pictorial representation taken from FIG. 10 showing the yoke 104 and a partial portion of the corresponding tarp section 108B. Each tarp section in the figures includes an inner edge 109 of the yoke 104 and corresponding tarp section (e.g., 108A, 108B, 108C, and 108D) where the body 128 and yoke 104 of the tarp 100 have sections (e.g., 108A, 108B, 108C, and 108D) with an angle less than 90 degrees, such as 85 degrees. The lift ring 106 (FIG. 3) is generally circular in shape and has a circumference with a preferred radius or arc, depending upon the type of tarp configuration. At least part of the fabrication of the fill-under tarp 100 is performed while the tarp is lying flat on a surface. For example, the inner edge 109 of the yoke 104 is often cut, for convenience, while the tarp 100 is lying flat on a surface. The original radius 144 of the cut arc can be measured from the center point 146 where two opposing seams (e.g., 134A, 134B, 134C, and 134D) of a section (e.g., 108A, 108B, 108C, and 108D) would intersect if extended from the inner edge 109 toward the center the yoke 104. However, cutting the inner edge 109 of the yoke 104 using this approach results in an inner edge 109 that fails to accurately approximate the radius and arc of the lift ring 106 when the tarp 100 is in-use and conical in shape. Thus, in a preferred aspect of the present disclosure, the inner edge 109 is adjusted for being cut while the tarp 100 is lying flat and cut in a manner to best approximate the shape of the lift ring 106 so the hooks 107B (FIG. 2) attach to the lift ring 106 for when the tarp 100 is in-use and conical in shape, such as, when the tarp 100 is extending outward from the lift ring 106 at the angle of repose 156 of the grain (e.g., approximately 21 degrees). Since the arc length of the inner edge 109 should not change to match the circumference of the lift ring 106, to best approximate the arc length of the inner edge 109 for a section (e.g., 108A, 108B, 108C, and 108D) of the tarp 100 when in use, the center point 146 is moved away from the inner edge 109 and the center point 146 to create an adjusted center point 148. The original radius 144 is also lengthened congruent with the distance the center point 146 is adjusted to location of the adjusted center point 148 for creating an adjusted radius 150. The following formula can be used to calculate the adjusted radius:

$$x = y/\cos*(\text{angle of repose})$$

where the variable "x" is the distance of the adjusted radius 150, "y" is the original radius 144, "cos" is the abbreviation for cosine, and "angle of repose" 156 is the angle of the pile of grain and tarp when in-use.

Using the adjusted radius 150 a cut is made along the arc of the adjusted radius 150 in the yoke 104 creating an arc defining the adjusted inner edge 158 that best approximates the lift ring 106 when the tarp 100 is in-use, conical in shape, and angled generally at the angle of repose 156.

Installing the tarp 100 often involves joining yoke seams (e.g., 134A, 134B, 134C, and 134D) and section seams (e.g., 112A, 112B, 112C, and 112D) of each section (e.g., 108A, 108B, 108C, and 108D) together in the field, also known as "field seaming." It is often desirable to overlap seams (e.g., 134A, 134B, 134C, 134D, 112A, 112B, 112C, and 112D) of each section (e.g., 108A, 108B, 108C, and 108D) when field seaming sections together. It is further desirable to allow for overlap of the adjoining seams of the body 128 of the tarp 100 to have a sufficient amount of material joined together to create integrity in the seams. To create yoke overlap 164 in the yoke 104 of the tarp 100 for field-seaming, the arc defining the adjusted inner edge 158 is moved inward in the direction of arrow 154 toward the body 128 of the tarp 100 until there is sufficient material for overlapping for creating an adjusted arc 160. In at least one aspect of the disclosure, the arc defining the adjusted inner edge 158 is moved sufficiently inward in the direction of arrow 154 toward the body 128 of the tarp 100 to the adjusted arc 160 location to create an eight-inch width of overlapping material along the yoke seams (e.g., 134A, 134B, 134C, and 134D) and section seams (e.g., 112A, 112B, 112C, and 112D) of each section (e.g., 108A, 108B, 108C, and 108D). In another aspect, the arc defining the adjusted inner edge 158 is moved sufficiently inward in the direction of arrow 154 toward the body 128 of the tarp 100 to the adjusted arc 160 location to create less or more than an eight-inch width of overlapping material along the yoke seams (e.g., 134A, 134B, 134C, and 134D) and section seams (e.g., 112A, 112B, 112C, and 112D) of each section (e.g., 108A, 108B, 108C, and 108D). Since the adjusted arc 160 does not reach the yoke seams (e.g., 134A, 134B, 134C, and 134D), the opposing ends 166 of the adjusted arc 160 are extended on a path 162 tangent to the opposing ends 166 of the adjusted arc 160 so that the adjusted arc 160 extends to the seams (e.g., 134A, 134B, 134C, and 134D) of each section (e.g., 108A, 108B, 108C, and 108D) to create overlap in the yoke 104 for field-seaming. Tarp body overlap 168 can also be created for field seaming the adjoining seams of the body 128 of the tarp 100 together.

The disclosure is not to be limited to the particular aspects described herein. In particular, the disclosure contemplates numerous variations in yoke 104 and body 128 of the fill under tarp 100. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. A fill under tarp for grain, comprising:
    a tarp body having a plurality of tarp sections, each tarp section having an inner edge extending to a terminal outer edge defining an outer perimeter of the tarp body;
    a tarp section seam disposed between each adjoining tarp section, wherein the tarp section seam extends between the inner and terminal outer edge of the tarp body;
    a yoke having a center and opposing inner and outer terminal edges, the yoke disposed generally in a center of the tarp body and configured for strengthening the tarp body;
    a corner of the outer terminal edge of the yoke disposed coincident with the tarp section seam;
    a transition seam disposed between the outer terminal edge of the yoke and inner edge of the tarp body; and
    an opening in the yoke having an outer circumference coincident with the inner edge of the yoke, wherein the opening is configured to receive grain for storing underneath the fill under tarp.

2. The fill under tarp of claim 1, wherein the tarp is square in shape and has four of the corners of the outer terminal edge of the yoke disposed coincident with the tarp section seam.

3. The fill under tarp of claim 2, wherein the four corners of the outer terminal edge of the yoke are disposed furthest from the center of the yoke.

4. The fill under tarp of claim 1, further comprising:
    a center tower skirt having an outer circumference, an upper terminal edge, and a lower terminal edge opposite the upper terminal edge, the lower terminal edge of the center tower skirt joined to the inner terminal edge of the yoke, the outer circumference of the center tower skirt approximating the outer circumference of the opening in the yoke, and the upper terminal edge of the center tower skirt configured to receive grain for passing through the opening in the yoke.

5. The fill under tarp of claim 1, wherein each tarp section comprises a plurality of tarp panels extending parallel with each other from the terminal outer edge of the tarp body to the inner edge of the tarp body.

6. The fill under tarp of claim 5, wherein the plurality of tarp panels have longitudinal edges parallel with a first tarp section seam and lateral edges perpendicular with a second tarp section seam, wherein the first tarp section seam is oriented 85 degrees from the second tarp section seam.

7. The fill under tarp of claim 5, wherein the plurality of tarp panels have angled edges joined to the outer terminal edge of the yoke, and wherein an angle between the longitudinal edge of the tarp panel and the angled edge is 45 degrees.

8. The fill under tarp of claim 1, further comprising:
    a yoke seam disposed between sections of the yoke and extending between the opposing inner and outer terminal edges of the yoke, wherein the yoke seam is aligned with the tarp sectional seam.

9. The fill under tarp of claim 8, wherein an angle between the tarp section seam and the yoke seam is less than 90 degrees.

10. A fill under tarp for grain, comprising:
    a tarp body having a plurality of tarp sections, each tarp section having an inner edge extending to a terminal outer edge defining an outer perimeter of the tarp body;
    a tarp section seam disposed between each adjoining tarp section, wherein the tarp section seam extends between the inner and terminal outer edge of the tarp body;
    a yoke having a center and opposing inner and outer terminal edges, the yoke disposed generally in a center of the tarp body and configured for strengthening the tarp body;
    a corner of the outer terminal edge of the yoke disposed coincident with the tarp section seam;
    a transition seam disposed between the outer terminal edge of the yoke and inner edge of the tarp body; and
    an opening in the yoke having an outer circumference coincident with the inner edge of the yoke, wherein the opening is configured to receive grain for storing underneath the fill under tarp.

11. The fill under tarp of claim 10, wherein the four corners of the yoke are disposed furthest from the center of the yoke.

12. The fill under tarp of claim 10, further comprising:
    a center tower skirt having an outer circumference, an upper terminal edge, and a lower terminal edge opposite the upper terminal edge, the lower term edge of the center tower skirt joined to the inner circular-shaped edge of the yoke, the outer circumference of the center tower skirt approximating the outer circumference of the opening in the yoke, and the upper terminal edge of the center tower skirt configured to receive grain for passing through the opening in the yoke.

13. The fill under tarp of claim 10, wherein each tarp section comprises a plurality of tarp panels extending parallel with each other from the terminal outer edge of the tarp body to the inner edge of the tarp body.

14. The fill under tarp of claim 13, wherein the plurality of tarp panels have longitudinal edges parallel with a first tarp section seam and lateral edges perpendicular with a second tarp section seam, wherein the first tarp section seam is oriented 85 degrees from the second tarp section seam.

15. The fill under tarp of claim 13, wherein the plurality of tarp panels have angled edges joined to the outer square-shaped edge of the yoke, and wherein an angle between the longitudinal edge of the tarp panel and the angled edge is 45 degrees.

16. The fill under tarp of claim 10, further comprising:
    a yoke seam disposed between sections of the yoke and extending between the inner circular-shaped edge and the outer square-shaped edge of the yoke, wherein the yoke seam is coincident with the diagonals of the yoke and aligned with the tarp sectional seam.

17. The fill under tarp of claim 10, wherein yoke further comprises a plurality of yoke sections, each yoke section disposed between the inner circular-shaped edge, the outer square-shaped edge, and opposing yoke seams.

18. The fill under tarp of claim 17, further comprising an angle between the opposing yoke seams equal to 85 degrees.

19. A grain storage system comprising:
- a grain storage location having a barrier wall forming a bunker;
- a tower structure operably configured with a conveyor for transporting grain to store within the bunker;
- a fill under tarp supported by the tower structure atop the bunker, the fill under tarp comprising:
  - a tarp body having a plurality of tarp sections, each tarp section having an inner edge extending to a terminal outer edge defining an outer perimeter of the tarp body, wherein the terminal outer edge is battened to the barrier wall;
  - a tarp section seam disposed between each adjoining tarp section, wherein the tarp section seam extends between the inner and terminal outer edge of the tarp body;
  - a yoke having a center and opposing inner and outer terminal edges, the yoke disposed generally in the enter of the tarp body and configured for strengthening the tarp body;
  - a corner of the outer terminal edge of the yoke disposed coincident with the tarp section seam;
  - a transition seam disposed between the outer terminal edge of the yoke and inner edge of the tarp body; and
  - an opening in the yoke having an outer circumference coincident with the inner edge of the yoke, wherein the opening is configured to receive grain from the conveyor for storing in the bunker underneath the fill under tarp.

20. The grain storage system of claim 19, further comprising:
- a lift ring operably secured between the yoke and the tower structure for supporting the fill under tarp atop the bunker, wherein the fill under tarp is generally conical in shape.

* * * * *